(12) United States Patent
Guo et al.

(10) Patent No.: US 7,913,358 B2
(45) Date of Patent: Mar. 29, 2011

(54) HINGE ASSEMBLY FOR FOLDABLE ELECTRONIC DEVICE

(75) Inventors: Geng-Hui Guo, Shenzhen (CN); Shi-Jin Long, Shenzhen (CN); Xi-Qiu Wu, Shenzhen (CN); Hsiao-Hua Tu, Taipei Hsien (TW); Guang-Xiang Zhang, Shenzhen (CN); Xiang-Ming Guo, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 585 days.

(21) Appl. No.: 11/957,331

(22) Filed: Dec. 14, 2007

(65) Prior Publication Data

US 2009/0007378 A1 Jan. 8, 2009

(30) Foreign Application Priority Data

Jul. 4, 2007 (CN) .......................... 2007 1 0076379

(51) Int. Cl.
 *E05D 11/10* (2006.01)
(52) U.S. Cl. .......................................... 16/330; 16/303
(58) Field of Classification Search ............... 16/330, 16/303, 334, 324, 326, 327; 379/428.02, 379/433.12, 433.13; 455/575.3, 566
See application file for complete search history.

(56) References Cited

U.S. PATENT DOCUMENTS

| | | | | |
|---|---|---|---|---|
| 2,814,049 A * | 11/1957 | Mercur | ........................ | 4/241 |
| 6,148,480 A * | 11/2000 | Cooke | ........................ | 16/303 |
| 6,886,221 B2 * | 5/2005 | Minami et al. | ................ | 16/324 |
| 6,948,217 B2 * | 9/2005 | Higano et al. | ................ | 16/303 |
| 2004/0181909 A1 * | 9/2004 | Kawamoto | .................. | 16/330 |
| 2005/0091794 A1 * | 5/2005 | Kang | ........................ | 16/284 |
| 2006/0242795 A1 * | 11/2006 | Duan et al. | .................. | 16/330 |
| 2007/0094843 A1 * | 5/2007 | Yang | ........................ | 16/330 |
| 2008/0201900 A1 * | 8/2008 | Kubota | ........................ | 16/221 |
| 2010/0024165 A1 * | 2/2010 | Kosugi et al. | .................. | 16/303 |

FOREIGN PATENT DOCUMENTS

WO 2007069300 A1 6/2007

* cited by examiner

*Primary Examiner* — Chuck Y. Mah
(74) *Attorney, Agent, or Firm* — Jeffrey T. Knapp (57) ABSTRACT

A hinge assembly (100) for a foldable electronic device (200) includes a shaft (40), a first follower (33) attached on one end of the shaft, a first cam (34) rotatably attached on the shaft, a resilient member (50) having one end abutting the first cam, a second cam (63) rotatably attached on the shaft and abutting the other end of the resilient member, a second follower (62) attached on the shaft, and a button (70) attached on the other end of the shaft and abutting the second follower. The first follower is rotating with the shaft and has a first follower surface (332). The first cam has a first cam surface (342) engaging with the first follower surface. The second cam has a second cam surface (632). The second follower has a second follower surface (624) engaging with the second cam surface.

18 Claims, 12 Drawing Sheets

HINGE ASSEMBLY FOR FOLDABLE ELECTRONIC DEVICE

BACKGROUND OF THE INVENTION

1. Field of the Invention

The present invention relates to hinge assemblies, and particularly to a hinge assembly for a foldable electronic device.

2. Discussion of the Related Art

With the development of the technologies of wireless communication and information processing, foldable electronic devices such as mobile phones and PDAs (Personal Digital Assistants) are now in widespread use. These foldable electronic devices enable consumers to enjoy the convenience of high technology services almost anytime and anywhere. Foldable mobile telephones are particularly favored by consumers for its comprehensive useful features.

Conventionally, a hinge assembly for a foldable portable device includes two barrel portions, which are provided respectively on a main body case and on a flip case of the foldable portable device. A central hinge pin movably fixes the barrel portions together. Thus, the flip case is rotatably connected to the main body case by the hinge assembly.

With the conventional hinge assembly described above, two hands are generally needed to rotatingly open the flip case up from the main body case. One hand is used to hold the main body case, while the other hand rotates the flip case up. This can be inconvenient for a user who is busy doing other things with his/her hands at the same time.

An automatic hinge assembly to solve the above problem is known in the art. The automatic hinge assembly usually includes a motor to drive a cam to rotate relative to a cam follower, thereby to open a flip case relative to a main body case of a foldable portable device. However, such automatic hinge assembly is complicated.

Therefore, a new hinge assembly for a foldable electronic device is desired in order to overcome the above-described shortcoming.

SUMMARY

In one embodiment thereof, a hinge assembly for a foldable electronic device includes a shaft, a first follower attached on one end of the shaft, a first cam rotatably attached on the shaft, a resilient member having one end abutting the first cam, a second cam rotatably attached on the shaft and abutting the other end of the resilient member, a second follower attached on the shaft, and a button attached on the other end of the shaft and abutting the second follower. The first follower is rotating with the shaft and has a first follower surface defined at one end thereof. The first cam has a first cam surface engaging with the first follower surface of the first follower to allow the first follower to be slidable and rotatable relative to the first cam. The second cam has a second cam surface defined at one end thereof. The second follower has a second follower surface engaging with the second cam surface of the second cam to allow the second follower to be slidable and rotatable relative to the second cam.

Other advantages and novel features of the embodiments will become more apparent from the following detailed description thereof when taken in conjunction with the accompanying drawings.

BRIEF DESCRIPTION OF THE DRAWINGS

Many aspects of the present hinge assembly can be better understood with reference to the following drawings. The components in the drawings are not necessarily to scale, the emphasis instead being placed upon clearly illustrating the principles of the present hinge assembly. Moreover, in the drawings, like reference numerals designate corresponding parts throughout the several views, in which.

DETAILED DESCRIPTION OF THE EMBODIMENT

Figure 1:
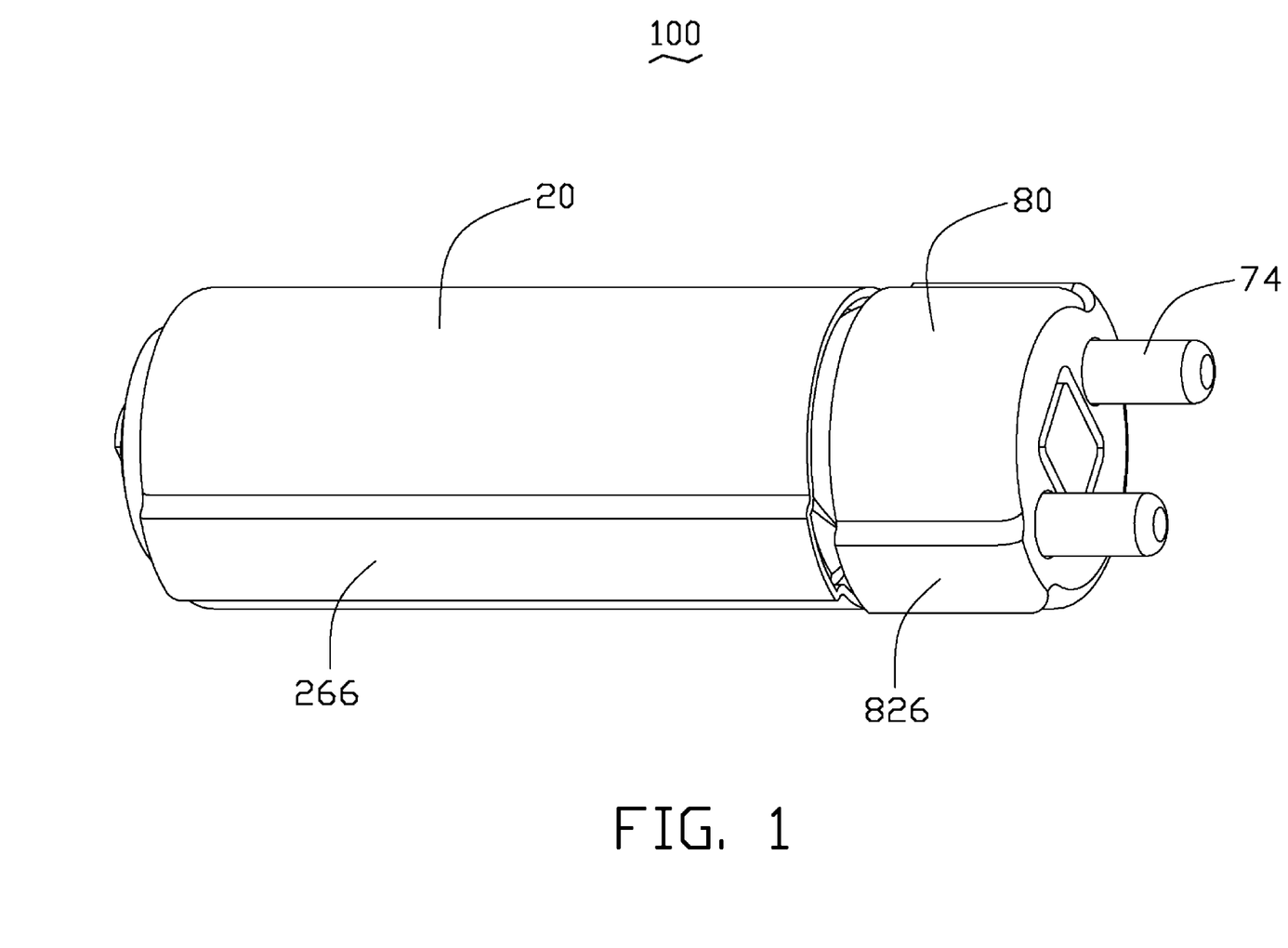
FIG. 1 is an assembled, isometric view of a hinge assembly, in accordance with a present embodiment.
Figure 9:
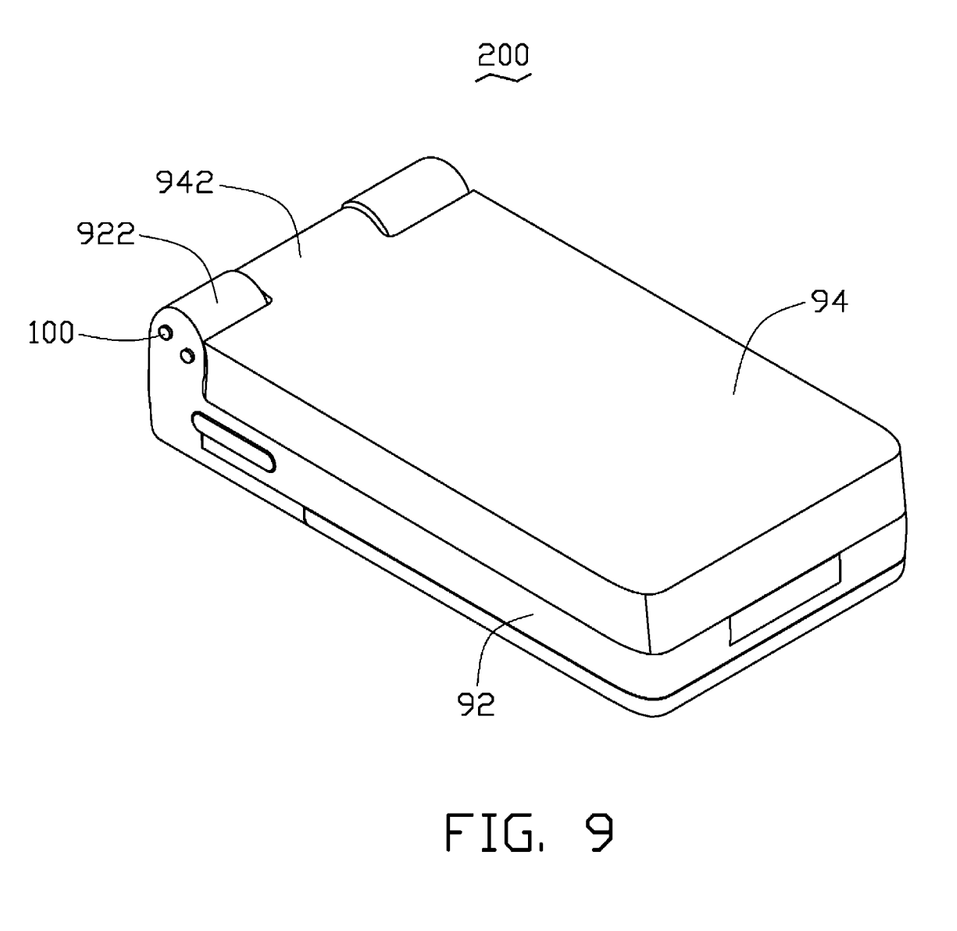
FIG. 9 is an isometric view of a foldable electronic device using the hinge assembly shown in FIG. 1.

Referring to the drawings in detail, FIGS. 1 and 9 show a hinge assembly 100 according to a present embodiment. The hinge assembly 100 is configured (i.e., structured and arranged) for interconnecting a flip case 94 to a main body case 92 of a foldable electronic device 200, thereby rotatably opening the flip case 94 relative to the main body case 92.

Figure 2:
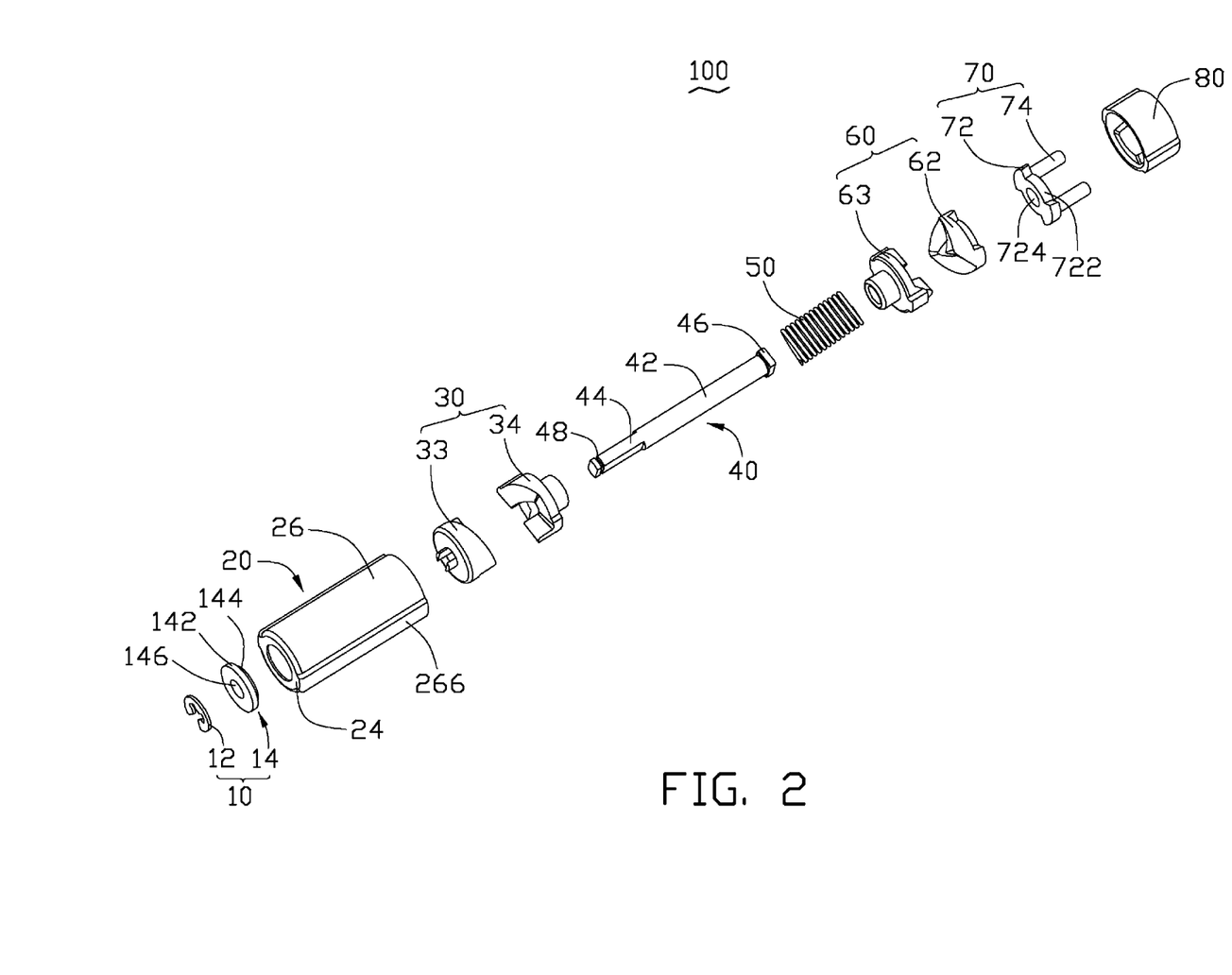
FIG. 2 is an exploded, isometric view of the hinge assembly shown in FIG. 1.

Also referring to FIG. 2, the hinge assembly 100 includes a securing module 10, a flip drive member 20, a first cam module 30, a shaft 40, a resilient member 50, a second cam module 60, a button 70, and a main body drive member 80. The securing module 10, the flip drive member 20, the first cam module 30, the resilient member 50, the second cam module 60, the button 70, and the main body drive member 80 surround the shaft 40.

The securing module 10 includes a gasket 14 and a disk 12 defining a generally Y-shaped notch (not labeled) therethrough. The disk 12 is made of a resin such as nylon. The gasket 14 is made of a resin such as nylon, and includes a first portion 142 and a second portion 144 connecting with each other and coaxially arranged with each other. Each of the first portion 142 and the second portion 144 is a flat round plate. The gasket 14 defines a through hole 146 through a center of the first portion 142 and a center of the second portion 144. The inner diameter of the gasket 14 is smaller than an outer diameter of the disk 12.

Figure 3:
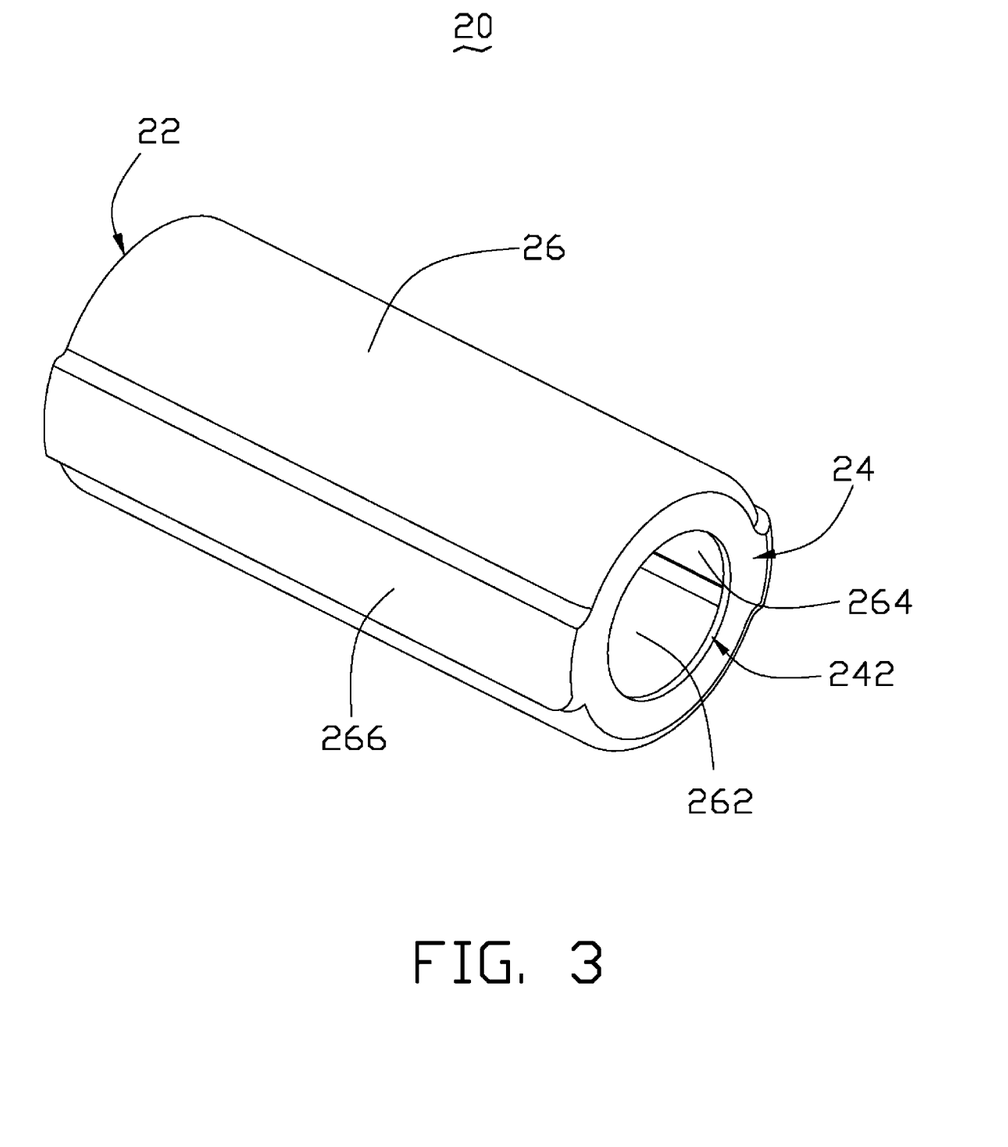
FIG. 3 is an enlarged, isometric view of a flip drive member of the hinge assembly shown in FIG. 1, viewed from another aspect.

Also referring to FIG. 3, the flip drive member 20 is a substantially hollow cylinder in shape, and has an open end 22 and an opposite half-closed end 24 defining an aperture 242 through a center thereof. The flip drive member 20 has a peripheral wall 26 and defines a receiving cavity 262 therethrough. The second portion 144 of the gasket 14 is configured for traveling through the aperture 242 into the receiving cavity 262. At least one portion of the peripheral wall 26 is structured to form at least one guiding groove 264 and at least one positioning block 266. In the present embodiment, there are two sets of guiding grooves 264 and positioning blocks 266 opposite to each other. Each guiding groove 264 and each positioning block 266 extend along an axial direction of the flip drive member 20. Each positioning block 266 is configured for being received and fixed in a barrel portion 942 of the flip case 94, and the flip drive member 20 is rotatable together with the flip case 94.

Figure 4:
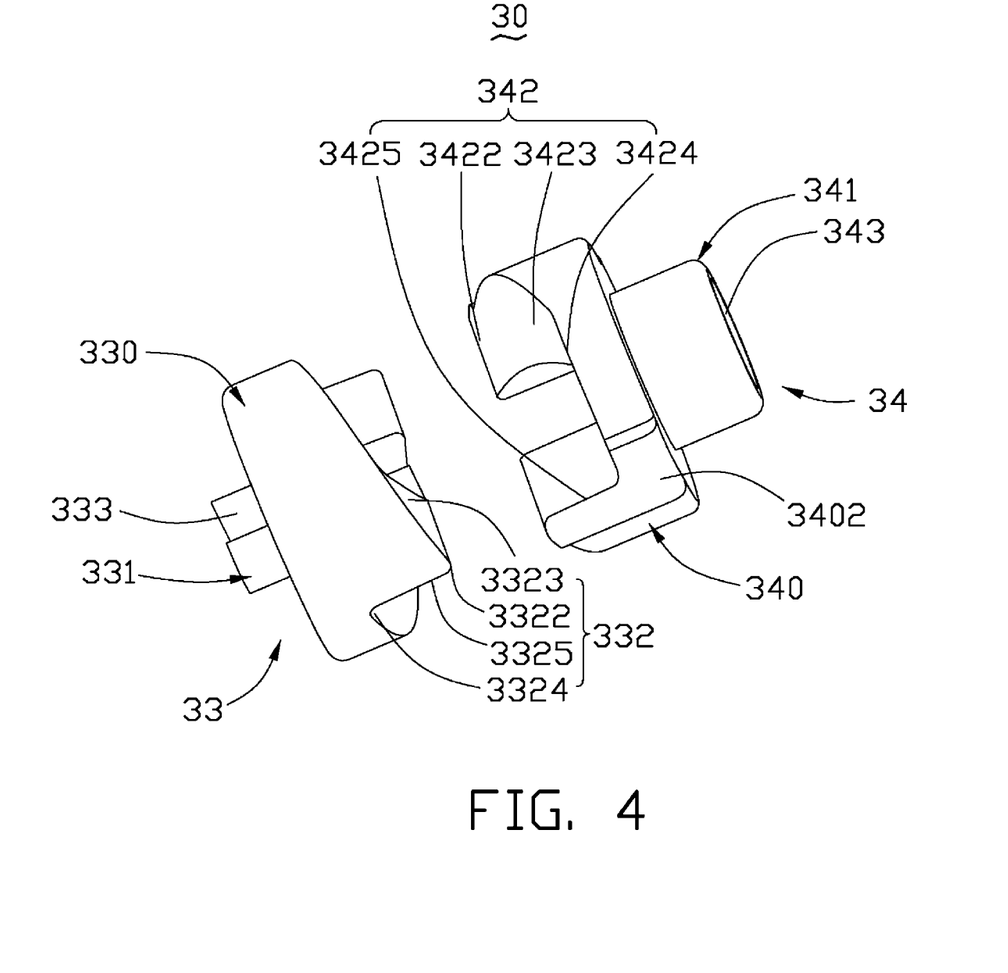
FIG. 4 is an enlarged, isometric view of a first cam module of the hinge assembly shown in FIG. 1.

Also referring to FIG. 4, the first cam module 30 includes a first follower 33 and a first cam 34. The first follower 33 includes a first follower body 330 and a first connecting portion 331, both in the form of a hollow cylinder and coaxially arranged with each other. The first connecting portion 331 is configured for being receivable in the through hole 146 of the gasket 14. The first follower 33 defines a substantially rectangular first follower hole 333 through a center of the first follower body 330 and a center of the first connecting portion 331. The first follower body 330 has one surface from which the first connecting portion 331 perpendicularly extends outwardly and an opposite end surface defining a first follower surface 332. The first follower surface 332 has at least one peak 3322 and at least one valley 3324. In the present embodiment, there are two peaks 3322 and two valleys 3324. An inclined surface 3323 and a vertical surface 3325 are respectively formed at two opposite sides of each valley 3324.

The first cam 34 includes a first cam body 340 and a first positioning cylinder 341, both in the form of a hollow cylinder and coaxially arranged with each other. The first cam 34 defines a first cam hole 343 through a center of the first cam body 340 and a center of the first positioning cylinder 341. The first cam hole 343 is substantially cylinder in shape. The first cam body 340 has one surface from which the first positioning cylinder 341 perpendicularly extends outwardly and an opposite end surface defining a first cam surface 342. The first cam surface 342 has at least one peak 3422 and at least one valley 3424. In the present embodiment, there are two peaks 3422 and two valleys 3424. Each valley 3424 has a flat surface. An inclined surface 3423 and a vertical surface 3425 are respectively formed at two sides of each valley 3424. At least one first mounting projection 3402 is formed on a peripheral wall of the first cam body 340. In the present embodiment, there are two first mounting projections 3402. Each first mounting projection 3402 extends along an axial direction of the first cam body 340 and is configured for being receivable in a corresponding guiding groove 264 of the flip drive member 20, and the first cam 34 is operative to be slidable relative to the flip drive member 20 and rotatable together with the flip drive member 20.

The shaft 40 is a substantially long pole in shape, and includes a cylindrical portion 42 and a deformed portion 44. The deformed portion 44 is configured for being receivable in the first follower hole 333 of the first follower 33 to enable the shaft 40 to rotate together with the first follower 33. The cylindrical portion 42 is configured for being receivable in the first cam hole 343 of the first cam 34 to enable the shaft 40 to rotate relative to the first cam 34. The cylindrical portion 42 has one end formed with the deformed portion 44 and an opposite end formed with a flange 46. The flange 46 is a substantially flat plate and rectangular in shape. The deformed portion 44 defines a ring groove 48 in one end thereof. The disk 12 is configured for being secured with the ring groove 48, thereby being fixed on the shaft 40.

The resilient member 50 is preferably made of metal and is spiral-shaped (i.e. a coiled spring). A diameter of the resilient member 50 is slightly larger than an outer diameter of the first positioning cylinder 341 of the first cam 34 and smaller than an outer diameter of the first cam body 340, and the resilient member 50 surrounds the first positioning cylinder 341 and abut against the first cam body 340.

Figure 5:
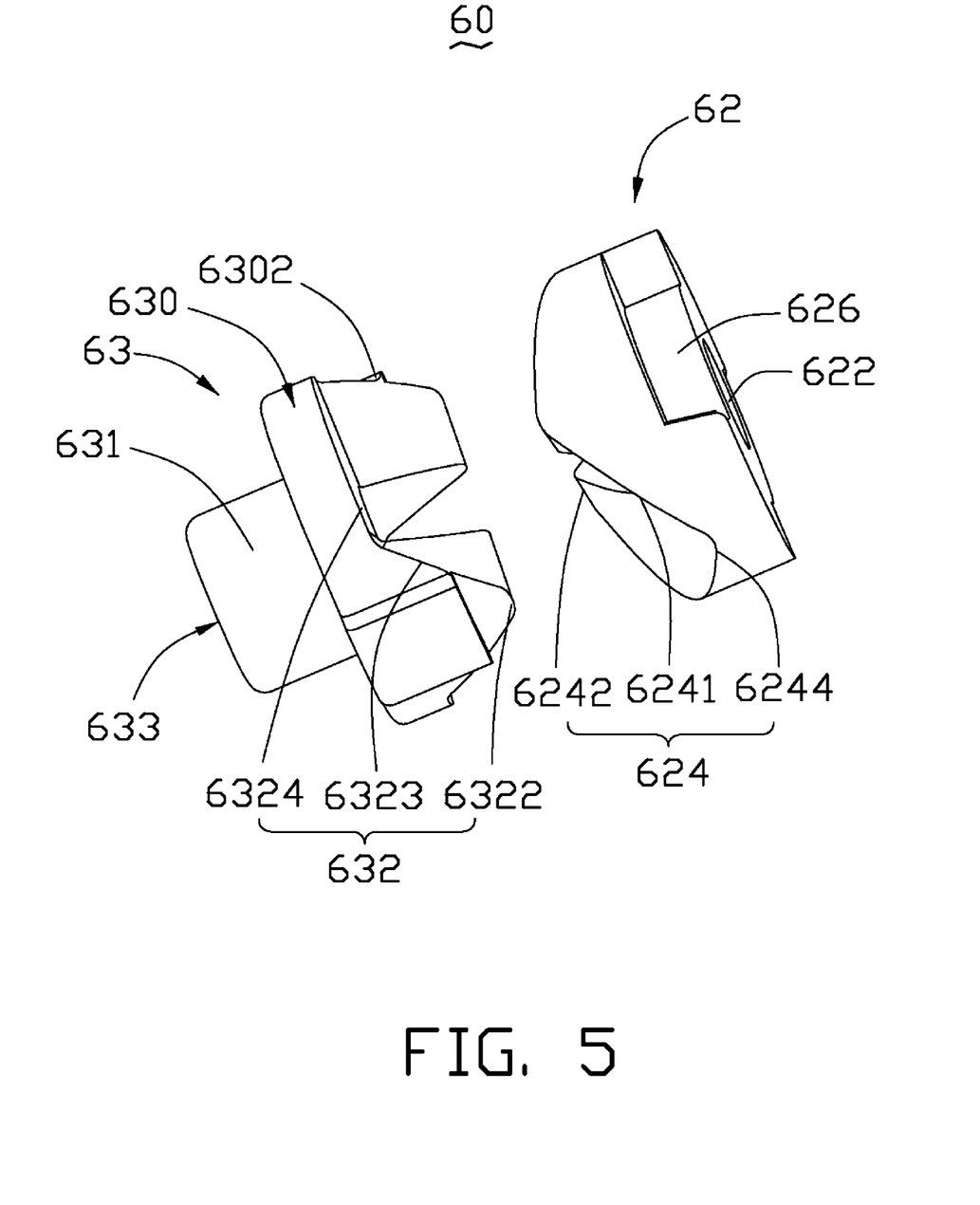
FIG. 5 is an enlarged, isometric view of a second cam module of the hinge assembly shown in FIG. 1.

Also referring to FIG. 5, the second cam module 60 includes a second follower 62 and a second cam 63. The second cam 63 includes a second cam body 630 and a second positioning cylinder 631, both in the form of a hollow cylinder and coaxially arranged with each other. The second cam 63 defines a substantially cylindrical second cam hole 633 through a center of the second cam body 630 and a center of the second positioning cylinder 631. The cylindrical portion 42 of the shaft 40 is configured for traveling through the second cam hole 633, to enable the second cam 63 to be rotatable relative to the shaft 40 and be slidable relative to the shaft 40.

The second cam body 630 has one end surface from which the second positioning cylinder 631 extends perpendicularly and outwardly, and an opposite end surface defining a second cam surface 632. A diameter of the resilient member 50 is slightly larger than an outer diameter of the second positioning cylinder 631 of the second cam 63, and the resilient member 50 surrounds the second positioning cylinder 631 and abuts against the second cam body 630. The second cam surface 632 has at least one peak 6322 and at least one valley 6324 provided thereon. In the present embodiment, there are two peaks 6322 and two valleys 6324. Each valley 6324 has a flat surface. Two inclined surfaces 6323 are respectively formed at two sides of each valley 6324. At least one second mounting projection 6302 is formed on a peripheral wall of the second cam body 630. In the present embodiment, there are two second mounting projections 6302. Each second mounting projection 6302 extends along an axial direction of the second cam body 630 and is configured for being receivable in a corresponding guiding groove 264 of the flip drive member 20, and the second cam 63 is slidable relative to the flip drive member 20 and is rotatable with the flip drive member 20.

The second follower 62 is substantially in the form of a hollow cylinder and defines a substantially cylindrical second follower hole 622 through a center thereof. The cylindrical portion 42 of the shaft 40 is configured for traveling through the second follower hole 622, thereby enabling the second follower 62 to be rotatable relative to the shaft 40 and to be slidable relative to the shaft 40. The second follower 62 has one end surface defining a second follower surface 624 with at least one peak 6242 and at least one valley 6244 formed thereon. In the present embodiment, there are two peaks 6242 and two valleys 6244. Two inclined surfaces 6241 are respectively formed at two sides of each valley 6244. The second follower 62 defines at least one positioning groove 626 in the peripheral wall thereof adjacent one end of the second follower 62. In the present embodiment, there are two positioning grooves 626.

The button 70 includes a mounting body 72 and at least one pole 74 extending from the mounting body 72. In the present embodiment, there are two poles 74. The mounting body 72 is a substantially flat plate and defines a button hole 724 through a center thereof. The mounting body 72 defines at least one sliding groove 722 in an edge thereof. In the present embodiment, there are two sliding grooves 722. Each pole 74 extends outwardly and perpendicularly from an outer end of the mounting body 72.

Figure 6:
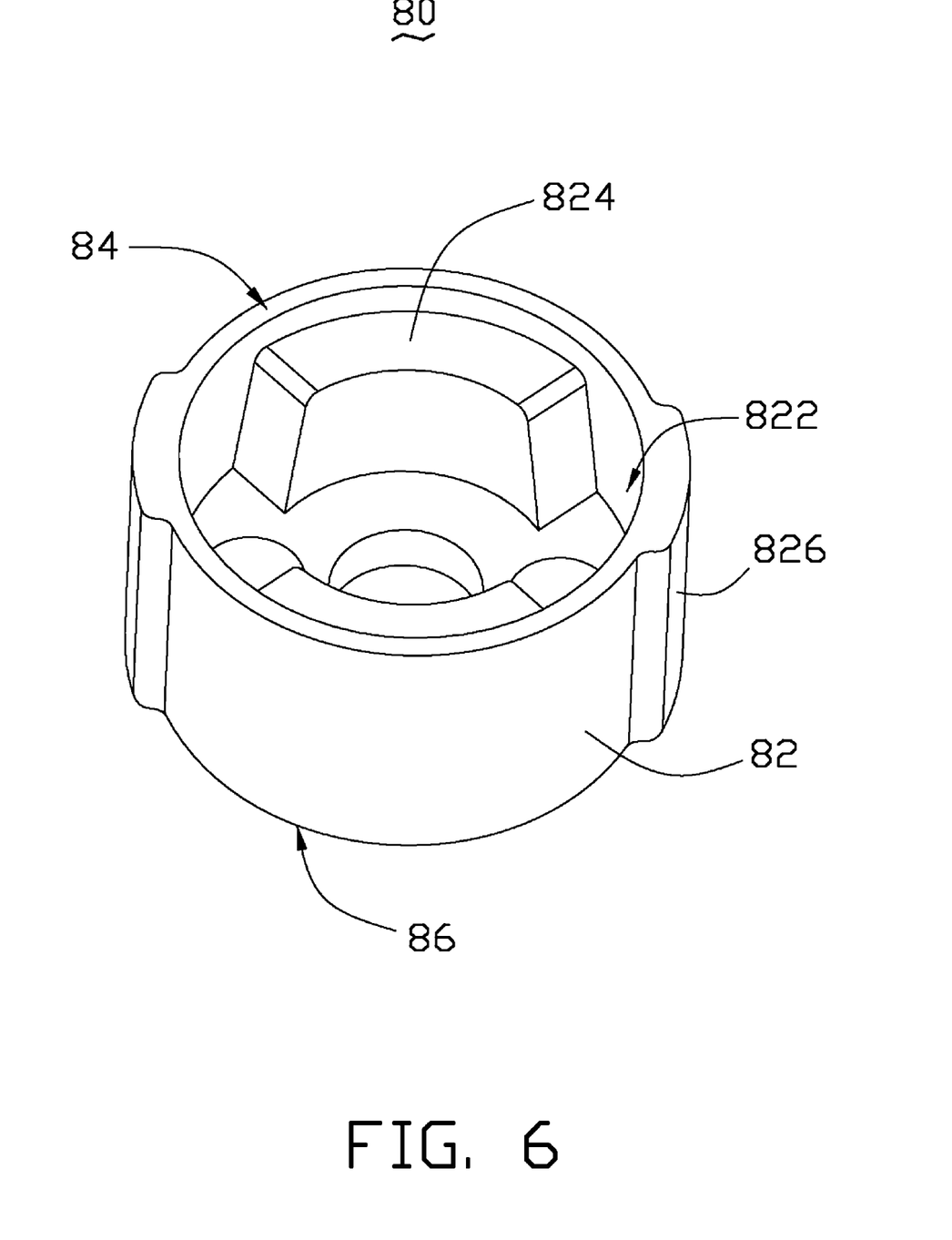
FIG. 6 is an enlarged, isometric view of a main body drive member of the hinge assembly shown in FIG. 1, viewed from another aspect.

Also referring to FIG. 6, the main body drive member 80 has a barrel body 82. The barrel body 82 defines a mounting cavity 822 in a center thereof. The barrel body 82 has an open end 84 and a half-closed end 86 on the opposite side of the open end 84. At least one positioning block 824 is formed on an inner wall of the barrel body 82. In the present embodiment, there are two positioning blocks 824. Each positioning block 824 is configured for being receivable in a corresponding positioning groove 626 of the second follower 62 and in a corresponding sliding groove 722 of the button 70. The second follower 62 and the button 70 are operative to be slidable relative to the main body drive member 80 or are rotatable together with the main body drive member 80. At least one protrusion 826 is formed on a peripheral wall of the barrel body 82. In the present embodiment, there are two protrusions 826. Also referring to FIG. 9, each protrusion 826 extends along an axial direction of the barrel body 82 and is configured for being receivable in a barrel portion 922 of the main body case 92, and the main body drive member 80 is rotatable together with the main body case 92.

Figure 7:
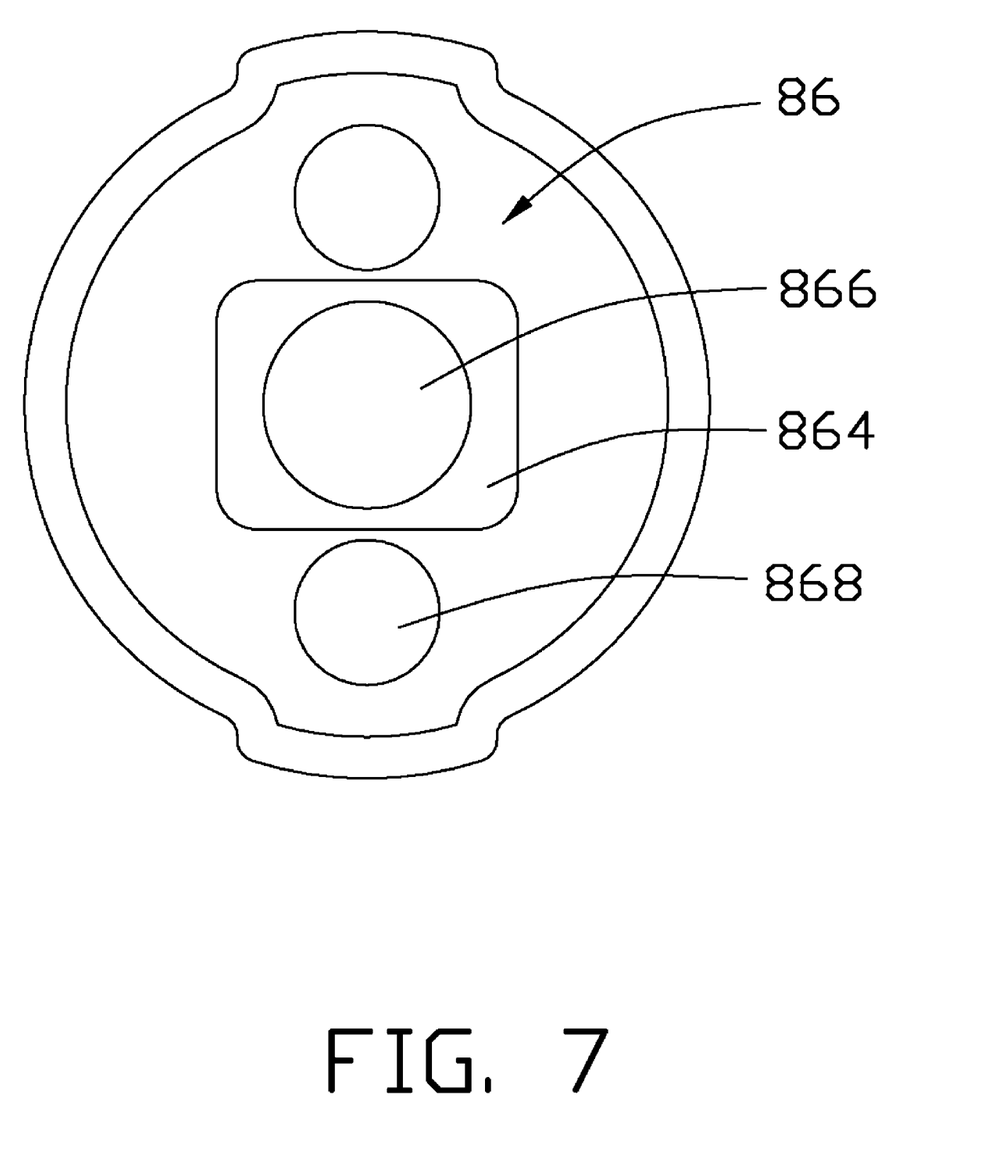
FIG. 7 is a planar view, taken from an opposite side, of the half-closed end of the main body drive member shown in FIG. 6.

Also referring to FIG. 7, the half-closed end 86 defines a central hole 866 through a center thereof and defines a rectangular recess 864 at an opposite side thereof, communicating with the central hole 866. The cylindrical portion 42 of the shaft 40 is configured for traveling through the central hole 866. The flange 46 of the shaft 40 is configured for being receivable in the rectangular recess 864, and the shaft 40 is rotatable together with the main body drive member 80. The half-closed end 86 defines at least one pole hole 868 therethrough adjacent to an edge thereof. In the present embodiment, there are two pole holes 868. Each pole 74 of the button 70 is configured for traveling through a corresponding pole hole 868.

Figure 8:
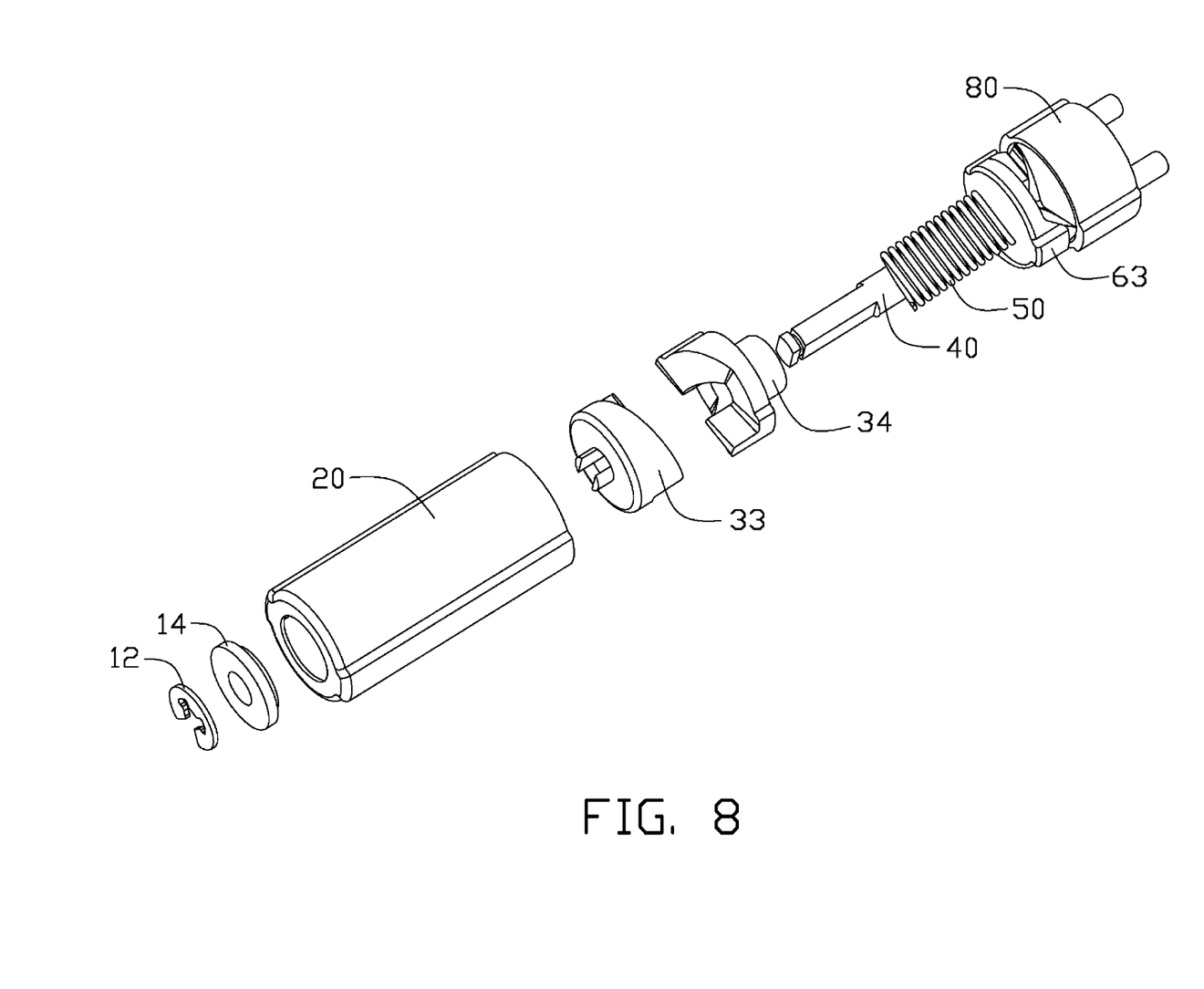
FIG. 8 is a partially assembled, isometric view of the hinge assembly shown in FIG. 1.

Also referring to FIG. 8, in assembly, the deformed portion 44 of the shaft 40 travels through the central hole 866 of the main body drive member 80, the button hole 724 of the button 70, the second follower hole 622 of the second follower 62, the second cam hole 633 of the second cam 63, the resilient member 50, the first cam hole 343 of the first cam 34, the first follower hole 333 of the first follower 33, the aperture 242 of the flip drive member 20, and the through hole 146 of the gasket 14. The disk 12 is then secured in the ring groove 48 of the shaft 40, thereby assembling the hinge assembly 100, as represented in FIG. 1. In the present embodiment, the flip drive member 20 is fixed to the flip case 94 by the engagement of the positioning blocks 266 and the barrel portion 942 of the flip case 94. The main body drive member 80 is fixed to the main body case 92 by the engagement of the protrusions 826 and the barrel portion 922 of the main body case 92.

The flange 46 of the shaft 40 is received in the rectangular recess 864 of the main body drive member 80. The mounting body 72 of the button 70 is received in the mounting cavity 822 of the main body drive member 80. Each sliding groove 722 of the button 70 receives a corresponding positioning block 824 of the main body drive member 80. Each pole 74 of the button 70 travels through a corresponding pole hole 868 and protrudes out of the main body drive member 80. The second follower surface 624 engages with the second cam surface 632. One end of the resilient member 50 surrounds the second positioning cylinder 631 and abuts the second cam body 630. The other end of the resilient member 50 surrounds the first positioning cylinder 341 and abuts the first cam body 340. The resilient member 50 is compressed between the second cam 63 and the first cam 34. The first follower surface 332 engages with the first cam surface 342. The second cam 63, the resilient member 50, the first cam 34, and the first follower 33 are received in the receiving cavity 262 of the flip drive member 20. Each second mounting projection 6302 of the second cam 63 and each first mounting projection 3402 of the first cam 34 are received in a corresponding guiding groove 264 of the flip drive member 20. The second portion 144 of the gasket 14 travels through the aperture 242 into the receiving cavity 262. The connecting portion 331 of the first follower 33 is received in the through hole 146 of the gasket 14.

Figure 10:
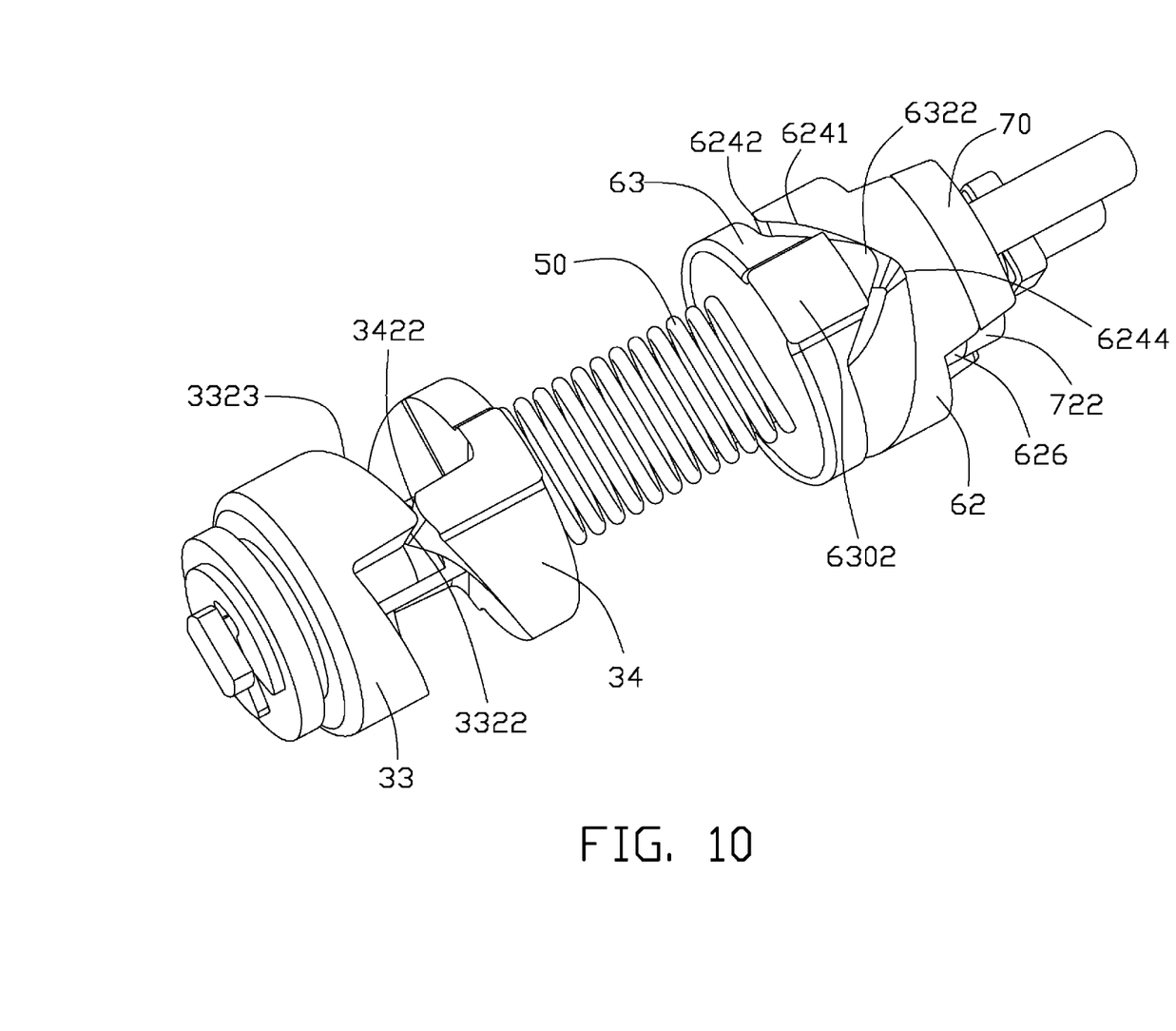
FIG. 10 is a partially assembled view of the hinge assembly not showing the flip drive member and the main body drive member, according to a closed state of the foldable electronic device.

Also referring to FIG. 10, when the foldable electronic device 200 is in a closed state (i.e., the flip case 94 is folded over the main body case 92), the second follower 62 is partially received in the main body drive member 80. Each positioning block 824 is partially received in a corresponding positioning groove 626 of the second follower 62. Each peak 6322 of the second cam 63 is located on a corresponding inclined surface 6241 of the second follower 62 and is adjacent to a corresponding valley 6244. Each peak 3422 of the first cam 34 is located on a corresponding peak 3322 of the first follower 33. A user may rotate the flip case 94 up from the main body case 92 by both hands or by only one hand.

Figure 11:
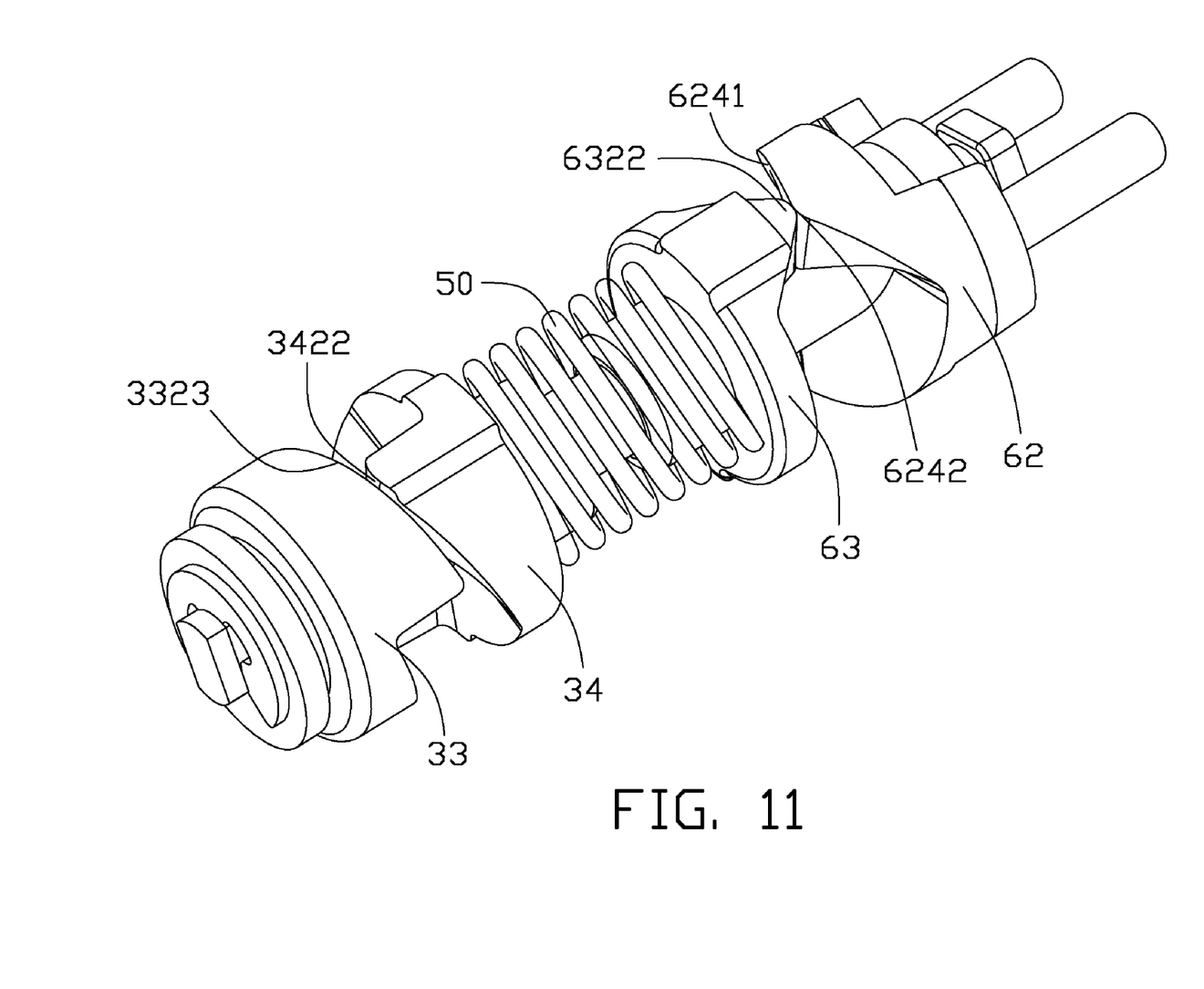
FIG. 11 is similar to FIG. 10, but showing a half-open state of the foldable electronic device.
Figure 12:
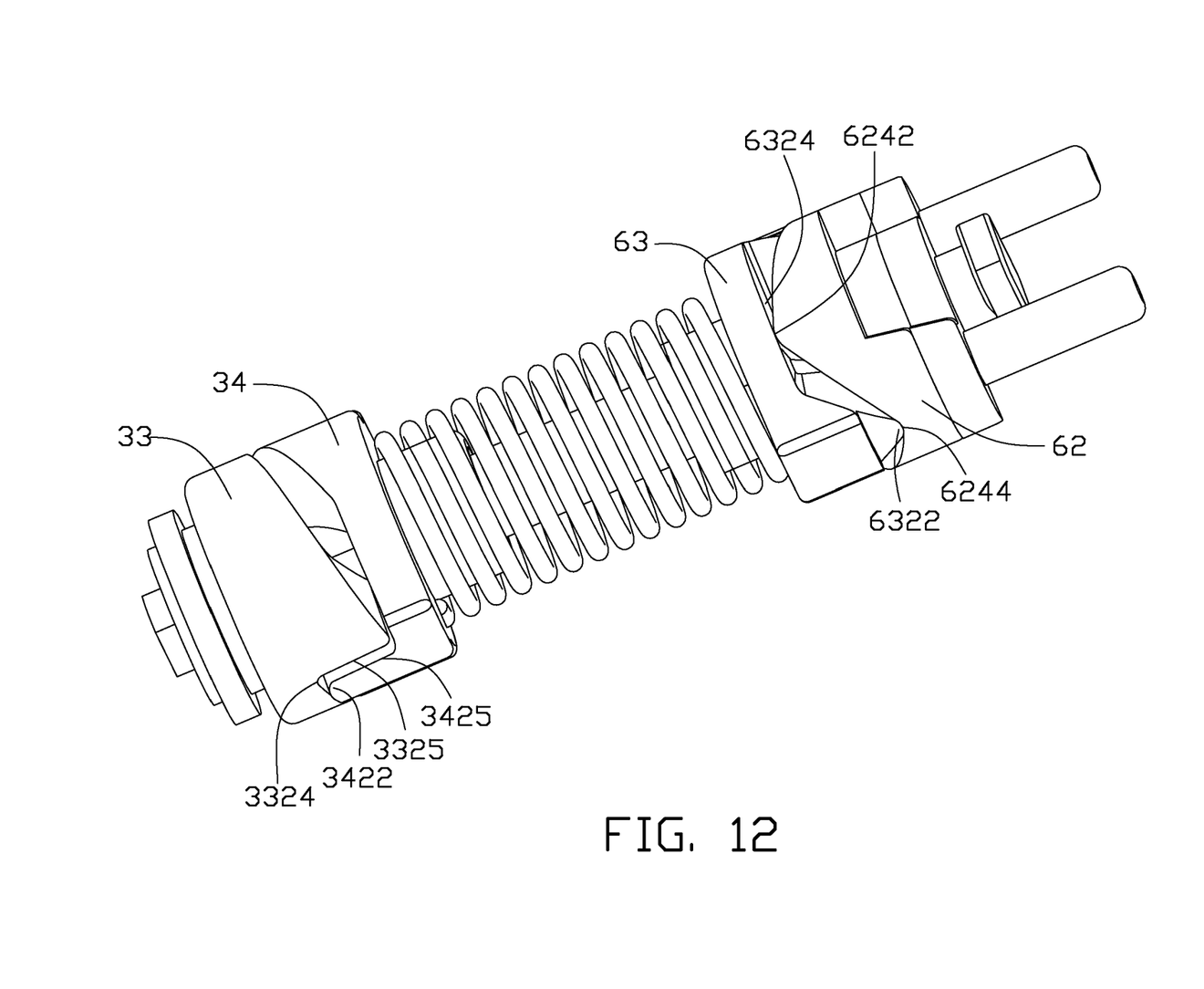
FIG. 12 is similar to FIG. 11, but showing a fully open state of the foldable electronic device.

Also referring to FIG. 11, when the user uses both hands to open the flip case 94 relative to the main body case 92, the flip case 94 is manually rotated upwards. Correspondingly, the flip drive member 20, the first cam 34, and the second cam 63 are rotated due to the engagement therebetween. Each peak 3422 of the first cam 34 slides along a corresponding inclined surface 3323, and each peak 6322 of the second cam 63 slides along a corresponding inclined surface 6241. When the peak 6322 rides over the peak 6242, the first cam 34 and the second cam 63 are rotated due to the decompression of the resilient member 50. Thus, the flip case 94 automatically rotates to a fully open state. Each peak 3422 is received in a corresponding valley 3324 of the first follower 33, and each peak 6322 is received in a corresponding valley 6244 of the second follower 62, as represented in FIG. 12. The closing process of the flip case 94 is substantially a reverse process of the above-described opening process.

When the user use only one hand to open the flip case 94 relative to the main body case 92, the poles 74 of the button 70 is pressed towards the second follower 62 by the user. The mounting body 72 of the button 70 slides towards the second follower 62 relative to the main body drive member 80. The second follower 62 together with the mounting body 72 slide, until the positioning grooves 62 of the second follower 62 disengages with the positioning blocks 824. Each peak 3422 of the first cam 34 slides along a corresponding inclined surface 3323. The first cam 34, the second cam 63, the second follower 62, and the flip drive member 20 are automatically rotated relative to the shaft 40 and the main body drive member 80 due to the decompression of the resilient member 50. Thus, the flip case 94 is automatically rotated upwards relative to the main body case 92. The flip case 94 is fully opened until the peak 3422 reaches the valley 3424.

It should be understood that the flip drive member 20 may be omitted. Correspondingly, the first cam 33 and the second cam 34 are directly mounted to one of the main body case 92 and the flip case 94.

It should be understood that the resilient member 50 may alternatively have a different configuration, for example, a leaf spring or a resilient cylinder. The flip drive member 20 may be fixed to the main body case 92 and the main body drive member 80 may be fixed to the flip case 94.

It should be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A hinge assembly for a foldable electronic device, the hinge assembly comprising:
   a shaft;
   a first follower attached on one end of the shaft and configured for rotating with the shaft, the first follower having a first follower surface defined at one end thereof;
   a first cam rotatably attached on the shaft and having a first cam surface defined at one end thereof, the first cam surface engaging with the first follower surface of the first follower to allow the first follower to be slidable and rotatable relative to the first cam;
   a resilient member having one end abutting the first cam;
   a second cam rotatably attached on the shaft and abutting the other end of the resilient member, the second cam having a second cam surface defined at one end thereof;
   a second follower attached on the shaft and having a second follower surface defined at one end thereof, the second follower surface engaging with the second cam surface of the second cam to allow the second follower to be slidable and rotatable relative to the second cam;
   a main body drive member fixed on the other end of the shaft, wherein one of the main body drive member and the second follower defines a positioning groove in a peripheral wall thereof, the other of the main body drive member and the second follower defines a positioning block in an inner wall thereof, and the positioning block is configured for being receivable in the positioning groove to prevent the second follower from rotating relative to the second cam; and
   a button attached on the other end of the shaft and abutting the second follower, wherein when the button is pushed, the positioning blocks slides out of the positioning groove so the second follower can rotate relative to the second cam.

2. The hinge assembly as claimed in claim 1, wherein at least one peak and at least one valley are formed on the end of the first follower and an inclined surface and a vertical surface are formed at two sides of the valley, thereby forming the first follower surface.

3. The hinge assembly as claimed in claim 2, wherein at least one peak and at least one valley are formed on the end of the first cam and an inclined surface and a vertical surface are formed at two sides of the valley, thereby forming the first cam surface.

4. The hinge assembly as claimed in claim 3, wherein the valley of the first cam has a flat surface.

5. The hinge assembly as claimed in claim 1, wherein at least one peak and at least one valley are formed on the end of the second follower and two inclined surfaces are formed at two sides of the valley, thereby forming the second follower surface.

6. The hinge assembly as claimed in claim 5, wherein at least one peak and at least one valley are formed on the end of the second cam and two inclined surfaces are formed at two sides of the valley, thereby forming the second cam surface.

7. The hinge assembly as claimed in claim 1, wherein one end of the button is configured for being receivable in the main body drive member and the other end of the button is configured for protruding out of the main body drive member.

8. The hinge assembly as claimed in claim 7, wherein the button is slidable relative to the main body drive member and is rotatable with the main body drive member.

9. The hinge assembly as claimed in claim 1, further comprising a flip drive member, wherein the first follower, the first cam, the resilient member, and the second cam are configured for being receivable in the flip drive member.

10. The hinge assembly as claimed in claim 9, wherein the flip drive member, the first cam, and the second cam are rotatable with each other.

11. A foldable electronic device comprising:
    a flip case;
    a main body case; and
    a hinge assembly configured for rotatably connecting the flip case to the main body case, the hinge assembly comprising:
    a shaft;
    a first follower attached on one end of the shaft and configured for rotating with the shaft, the first follower having a first follower surface defined at one end thereof;
    a first cam rotatably attached on the shaft and having a first cam surface defined at one end thereof, the first cam surface engaging with the first follower surface of the first follower to allow the first follower to be slidable and rotatable relative to the first cam;
    a resilient member having one end abutting the first cam;
    a second cam rotatably attached on the shaft and abutting the other end of the resilient member, the second cam having a second cam surface defined at one end thereof;
    a second follower attached on the shaft and having a second follower surface defined at one end thereof, the second follower surface engaging with the second cam surface of the second cam to allow the second follower to be slidable and rotatable relative to the second cam;
    a main body drive member fixed on one of the main body case and the flip case, wherein one of the main body drive member and the second follower defines a positioning groove in a peripheral wall thereof, the other of the main body drive member and the second follower defines a positioning block in an inner wall thereof, and the positioning block is configured for being receivable in the positioning groove to prevent the second follower from rotating relative to the second cam; and
    a button attached on the other end of the shaft and abutting the second follower, wherein when the button is pushed, the positioning blocks slides out of the positioning groove so the second follower can rotate relative to the second cam.

12. The foldable electronic device as claimed in claim 11, wherein at least one peak and at least one valley are formed on the end of the first follower and an inclined surface and a vertical surface are formed at two sides of the valley, thereby forming the first follower surface.

13. The foldable electronic device as claimed in claim 12, wherein at least one peak and at least one valley are formed on the end of the first cam and an inclined surface and a vertical surface are formed at two sides of the valley, thereby forming the first cam surface.

14. The foldable electronic device as claimed in claim 11, wherein one end of the button is configured for being receivable in the main body drive member and the other end of the button is configured for protruding out of the main body drive member, the button is slidable relative to the main body drive member and is rotatable with the main body drive member.

15. The foldable electronic device as claimed in claim 11, further comprising a flip drive member, wherein the first follower, the first cam, the resilient member, and the second cam are configured for being receivable in the flip drive member.

16. The foldable electronic device as claimed in claim 15, wherein the flip drive member, the first cam, and the second cam are rotatable with each other.

17. A hinge assembly for a foldable electronic device, the hinge assembly comprising:
   a shaft;
   a first follower non-rotatably attached on one end of the shaft and configured for rotating with the shaft, the first follower having a first follower surface defined at one end thereof;
   a first cam rotatably attached on the shaft and having a first cam surface defined at one end thereof, the first cam surface engaging with the first follower surface of the first follower to allow the first follower to be slidable and rotatable relative to the first cam;
   a resilient member having one end abutting the first cam;
   a second cam rotatably attached on the shaft and abutting the other end of the resilient member, the second cam having a second cam surface defined at one end thereof; and
   a second follower rotatably attached on the shaft and having a second follower surface defined at one end thereof, the second follower surface engaging with the second cam surface of the second cam to allow the second follower to be slidable and rotatable relative to the second cam;
   a main body drive member fixed on the other end of the shaft, wherein one of the main body drive member and the second follower defines a positioning groove in a peripheral wall thereof, the other of the main body drive member and the second follower defines a positioning block in an inner wall thereof, and the positioning block is configured for being receivable in the positioning groove to prevent the second follower from rotating relative to the second cam;
   a button attached on the other end of the shaft and abutting the second follower, wherein when the button is pushed, the positioning blocks slides out of the positioning groove so the second follower can rotate relative to the second cam.

18. The hinge assembly as claimed in claim 17, wherein the button is slidable relative to the main body drive member and is rotatable with the main body drive member.

* * * * *